(12) United States Patent
Liu et al.

(10) Patent No.: US 8,482,549 B2
(45) Date of Patent: Jul. 9, 2013

(54) MUTIPLE IMAGE PROJECTION APPARATUS

(75) Inventors: Ying Liu, Hong Kong (HK); Kinlung Chan, Hong Kong (HK); Weiping Tang, Shenzhen (CN)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 160 days.

(21) Appl. No.: 13/233,036

(22) Filed: Sep. 15, 2011

(65) Prior Publication Data
US 2012/0256879 A1 Oct. 11, 2012

Related U.S. Application Data

(60) Provisional application No. 61/473,165, filed on Apr. 8, 2011.

(51) Int. Cl.
*G03B 21/26* (2006.01)
*G06F 3/042* (2006.01)

(52) U.S. Cl.
USPC .......... 345/175; 359/640; 353/34; 353/8; 353/20

(58) Field of Classification Search
None
See application file for complete search history.

(56) References Cited

U.S. PATENT DOCUMENTS

| | | | |
|---|---|---|---|
| 6,490,087 B1 * | 12/2002 | Fulkerson et al. | 359/485.04 |
| 6,909,556 B2 * | 6/2005 | Berman et al. | 359/634 |
| 7,690,796 B2 * | 4/2010 | Bin et al. | 353/31 |
| 2009/0009726 A1 * | 1/2009 | Kuan et al. | 353/33 |
| 2009/0237616 A1 * | 9/2009 | Aizaki | 353/20 |

* cited by examiner

*Primary Examiner* — Jason Olson
(74) *Attorney, Agent, or Firm* — Ella Cheong Hong Kong; Margaret A. Burke; Sam T. Yip

(57) ABSTRACT

Multiple image projection apparatus are described. A cubic multi-prism beam splitter is provided having diagonal interfaces with one or more PBS elements and/or reflective elements positioned thereon. At least first and second spatial light modulators, such as LCoS SLMs, are positioned adjacent the beam splitter cube. The first and second LCoS spatial light modulators and first and second projection optics systems are configured to output a first modulated image from the first LCoS SLM to the first projection optics system and a second modulated image from the second LCoS spatial light modulator to the second projection optics system. In other embodiments, additional LCoS spatial light modulators and light sources produce 3-D images. Addition of sensors permits user interaction with a projected image which is fed back to a controller to optionally change current or future images displayed by the system.

21 Claims, 11 Drawing Sheets

Tilt 3D

MUTIPLE IMAGE PROJECTION APPARATUS

CROSS-REFERENCE TO RELATED APPLICATIONS

This application claims priority from U.S. Provisional Patent Application 61/473,165 filed 8 Apr. 2011, the disclosure of which is incorporated by reference herein.

TECHNICAL FIELD

The present invention relates to projection apparatus in general and, more particularly, to projection apparatus which can produce multiple images.

BACKGROUND

There are many applications in which multiple images must be displayed either sequentially or simultaneously. Current apparatus which can project multiple images are bulky, typically being complete duplicates of single-image projection apparatus. Typically, multiple light sources are required.

However, there is a need in the art for compact projection apparatus which can project multiple images, in which the multiple images each optionally display different image information. Such a projector could be used for wide-screen projection, three-dimensional image creation, and interactive imaging applications.

SUMMARY OF THE INVENTION

In one embodiment, the present invention is directed to a multiple image projection apparatus that has at least a first light source for providing light. A cubic multi-prism cemented beam splitter is further provided, the beam splitter having four sides and two diagonal interfaces including a beam splitter element positioned on at least one diagonal interface; in some embodiments, a mirror element is positioned on a portion of one of the diagonal interfaces.

First and second spatial light modulators, such as LCoS spatial light modulators, are provided adjacent the cubic multi-prism beam splitter.

The first and second LCoS spatial light modulators and the first light source being configured such that the first LCoS spatial light modulator and the first light source are positioned adjacent one side of the cubic multi-prism beam splitter and the second LCoS spatial light modulator and the second projection optics system share an opposite-facing side of the cubic multi-prism beam splitter. In this configuration, light from the first light source is formed into first and second polarized beams that are directed in orthogonal directions by the polarization beam splitter such that the first polarized beam is directed into the first LCoS spatial light modulator and the second polarized beam is directed into the second LCoS spatial light modulator.

A first image source modulates the first LCoS spatial light modulator and a second image source for producing images which may be the same or different from images produced using the first image source, modulates the second LCoS spatial light modulator. The first and second LCoS spatial light modulators and the first and second projection optics systems are configured such that a first modulated reflected output image from the first LCoS spatial light modulator is output to the first projection optics system and a second modulated reflected output image from the second LCoS spatial light modulator output to the second projection optics system.

In other embodiments, additional LCoS spatial light modulators and light sources are optionally added to produce 3-D images (when viewed with appropriate filters). Optional addition of sensors permits user interaction with a projected image which is fed back to a controller to change current or future images displayed by the system.

DETAILED DESCRIPTION OF THE INVENTION

Figure 1A:
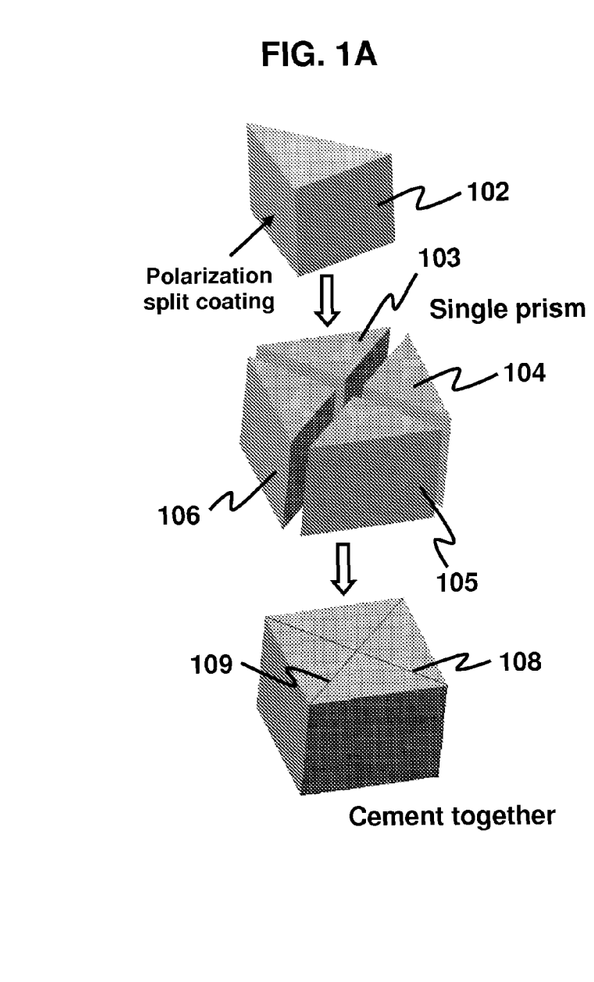
FIGS. 1A-1C depict polarization beam splitter cube structures used in the image projection apparatus of the present invention.
Figure 1B:
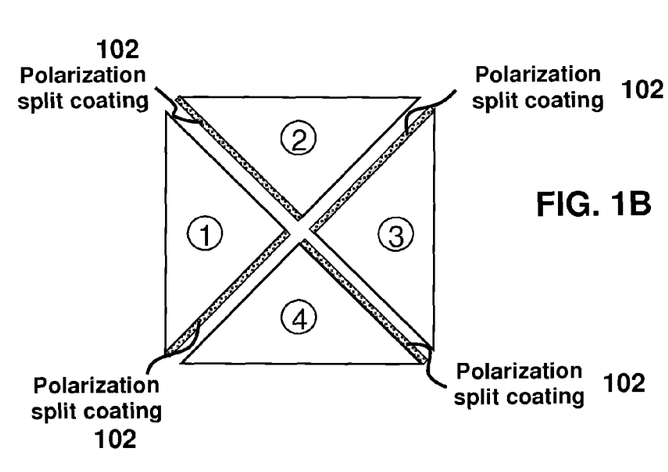
Figure 1C:
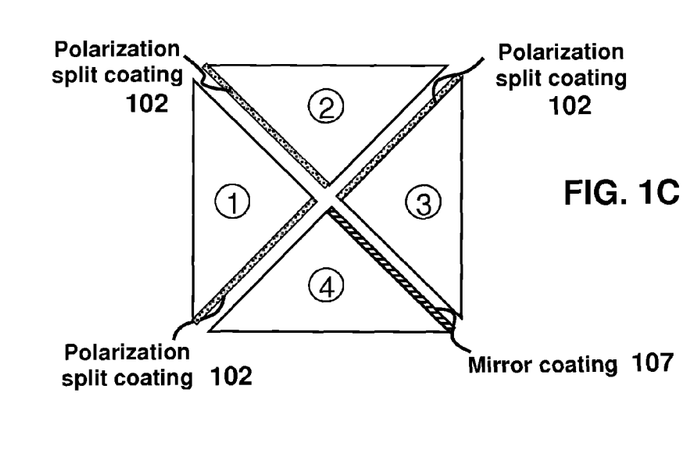

Turning to the drawings in detail, FIGS. 1A-1C depict polarization beam splitter cube structures used in the image projection apparatus of the present invention. As seen in FIG. 1A, it includes four prisms 103, 104, 105, and 106. The four prisms are cemented together to form an integrated cube, integrated polarization beam splitter 100. A surface coating 102 or other beamsplitting element is formed on a facet of each prism 103, 104, 105, and 106 that faces another prism facet; the elements are selected such that when the four prisms are assembled, the surfaces form a pair of orthogonal surfaces 108 and 109 of prism 100. In the embodiment of FIG. 1B, all of the surfaces are selected to include polarization beam splitter elements such as coatings, gratings, etc. such that two orthogonal diagonal beam splitter surfaces are created. In the embodiment of FIG. 1C, one prism is coated with a mirror coating rather than a polarization beam splitter element. The mirror coating reflects incident light of any polarization in a direction 90° from the mirror surface. The mirror coating can be selected form thin film coatings such as aluminum, silver, gold, or other metal or reflective coatings. Optionally, a grating micro structure or MOF film can also be attached between the two orthogonal surfaces 108 and 109 to be used as the polarization beam splitter element rather than a PBS coating material.

Figures 2A, 2B:
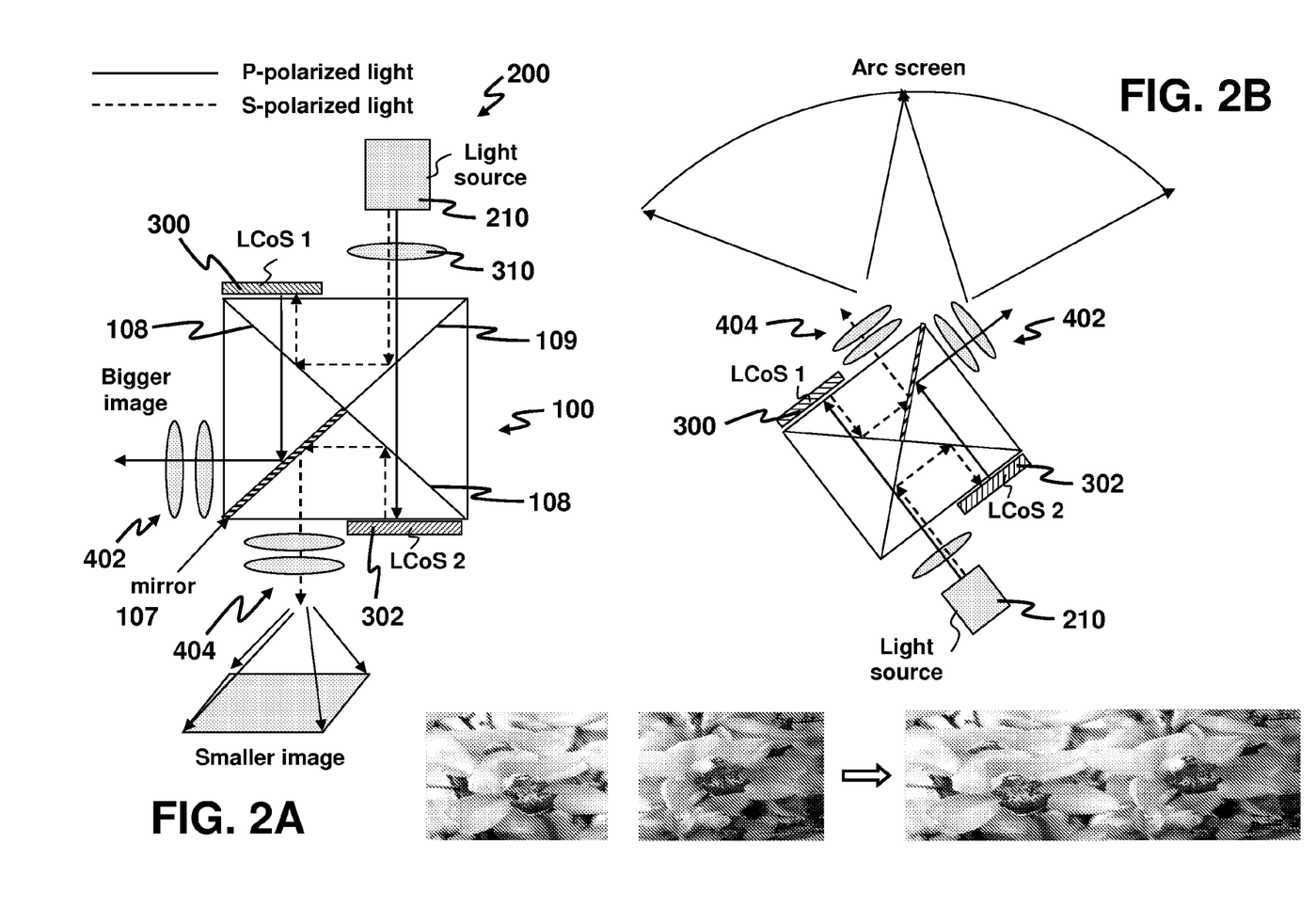
FIGS. 2A and 2B depict an image projection apparatus with one light source, two reflective spatial light modulators, and two projection optics systems.

FIGS. 2A and 2B depict a projection apparatus 200 using the PBS cube 100 of FIG. 1C (having one mirror coating 107). A single (unpolarized) light source 210 is incident to PBS cube 100. The light source may be a white light source or combined or sequential colored light sources (e.g., red, blue, green LED light sources). On the same side of the cube as light source 200 is a first reflective spatial light modulator 300. In an exemplary embodiment, reflective spatial light modulator 300 is a liquid crystal on silicon (LCoS) modulator; however, any low profile reflective spatial light modulator that can be positioned adjacent PBS cube 100 can be used in the projection apparatus of the present invention. Exemplary spatial light modulators (for all of the embodiments of the present invention) include, but are not limited to the liquid crystal on silicon spatial light modulators, digital micromirror device spatial light modulators, digital light processor spatial light modulators, MEMS spatial light modulators, liquid crystal spatial light modulators, mirror-based spatial light modulators, or any other low profile spatial light modulator that can process image information for projection. Note that the spatial light modulators in any projector may be the same kind of spatial light modulator or two or more kinds of spatial light modulators, depending upon the projector application.

On an opposite PBS cube surface, in line with incident light source 210, is a second reflective spatial light modulator 302; again, in this embodiment a LCoS spatial light modulator is depicted as light modulator 302 but other reflective spatial light modulators can be selected. Incident light from source 210 passes through incident light source optics 310 and enters the cube 100. When the light reaches the polarization beam splitter coated diagonal interface 109, light of one polarization passes through the cube in a straight line and is incident on second reflective spatial light modulator 302. Light of the opposite polarization is reflected by the polarization beam splitter surface 109 and is again reflected by polarization beam splitter surface 108 into first modulator 300. In the embodiment of FIG. 2A, a straight line indicates P-polarized light while a dashed line indicates S-polarized light. However, the opposite configuration can also be used (with P and S polarization light reversed) depending upon the selected beamsplitter element.

Modulated light of the opposite polarization is reflected by each reflective spatial light modulator 300, 302. Light that exits reflective spatial light modulator 300 is incident on mirror surface 107 and is reflected towards a first set of projection optics 402. Similarly, light that exits reflective spatial light modulator 302 is also reflected by mirror surface 107 towards a second set of projection optics 404. In this manner, two modulated images are formed.

Depending upon the application, the modulated images can be the same or different. For the application of FIG. 2A, it may be desirable to display the same image in two different locations and, optionally, two different sizes. For example, the main image display can be selected to be SVGA/XGA/720P/WSVGA resolution with a 0.3~0.4 inch active area; the smaller image projected from projection optics 404 can be of WVGA resolution with around a 0.2 inch active area. In contrast, in the embodiment of FIG. 2B, it may be desirable to display two different images on a single screen of the same image size and resolution that are "stitched together" to form a single wide screen image. Note that the projection screen can be a flat screen, a wall, a metal screen or any surface which can be projected upon.

Figure 3:
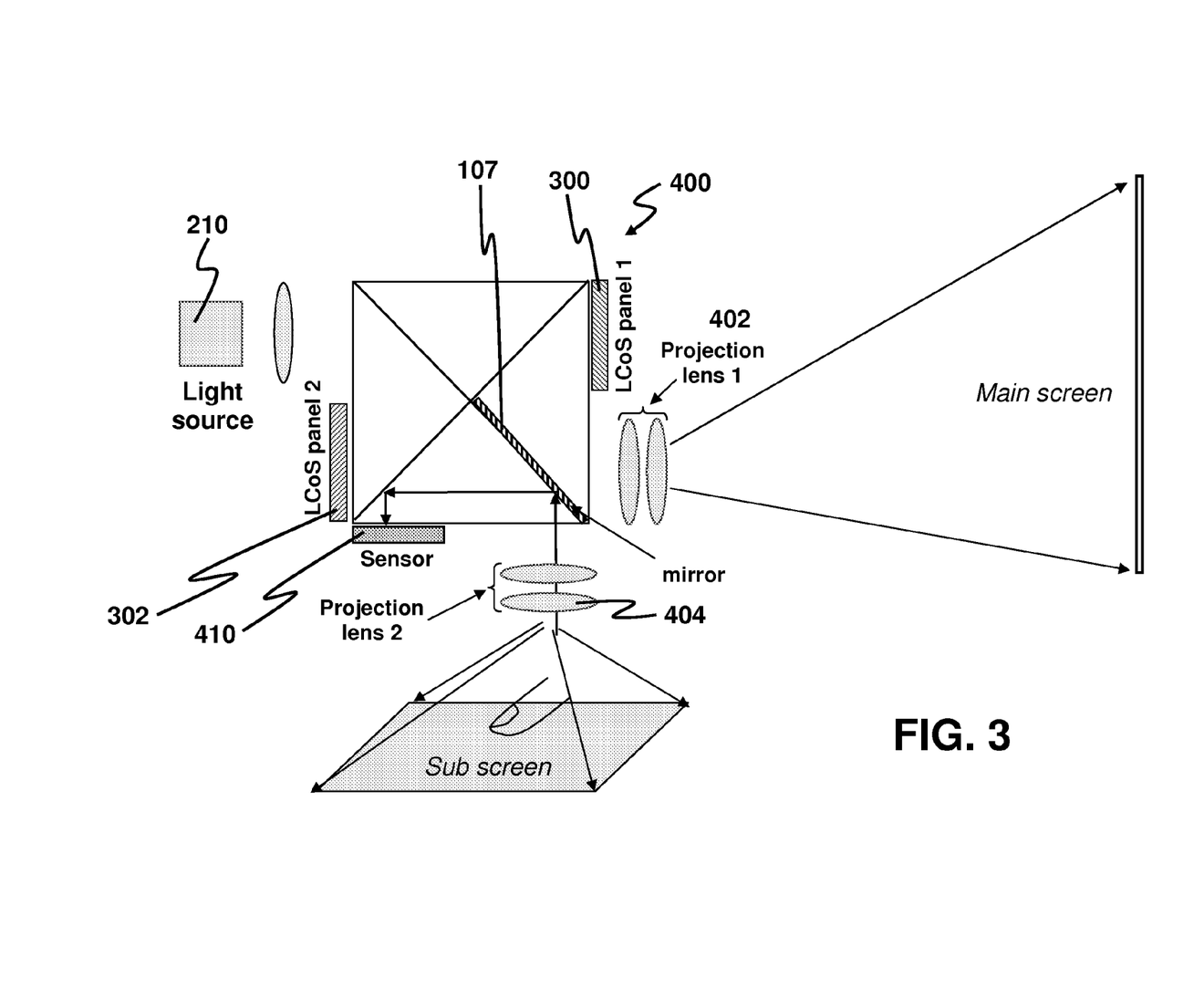
FIG. 3 depicts the image projection system of FIG. 2A with the addition of an image sensor.

FIG. 3 depicts a variation of the embodiment of FIG. 2A including an image sensor. Projection apparatus 400 includes two LCoS modulators 300, and 302, and two projection optics systems 402 and 404. In the image projected by optics system 404, interaction by a user with the image is captured by reflection back through optics system 404, reflected by reflector 107, and directed into image sensor 410 by the polarization beam splitter diagonal surface element. Image sensor 410 is selected from any conventional light image sensor such as a CMOS or CCD sensor. In this manner, input by a user is captured by the sensor; through the appropriate hardware and software, user input commands such as motions and/or handwriting can be recognized by the sensor or a controller/processor communicating with the sensor. Because the image sensor 410 and spatial light modulator 302 share the same projection lens 404, the image-sensor-captured-image is exactly what that projected by the projection lens 404, together with the user's hand or pen image. In this arrangement, no calibration is needed between the two images even if projection distance is different or individually changed. The captured image information may be fed back to the image signals presented to the modulators 300 and 302 to change the content of the display or interact in any other way with the image projection system. Because the use of two spatial light modulators enables different images to be displayed on a main screen and a sub screen/user screen, the interactive projector can be used to replace monitor and keyboard functions. Alternatively, the user screen can be used as a writing pad, image capture device, touch panel, and so forth.

FIGS. 4A-4D depict an image projection apparatus 500 with a PBS cube 100 having only polarization beam splitting elements on the orthogonal diagonal surfaces. Two light sources 240 and 260 are used (which may be single or multiple color sources as discussed above with reference to FIG. 2) along with four reflective spatial light modulators 350, 352, 354, and 356 positioned adjacent each PBS cube face and two projection optics systems, 406 and 408. For ease of understanding the invention, all the Figures show the same structure but with different light paths displayed.

Figure 4A:
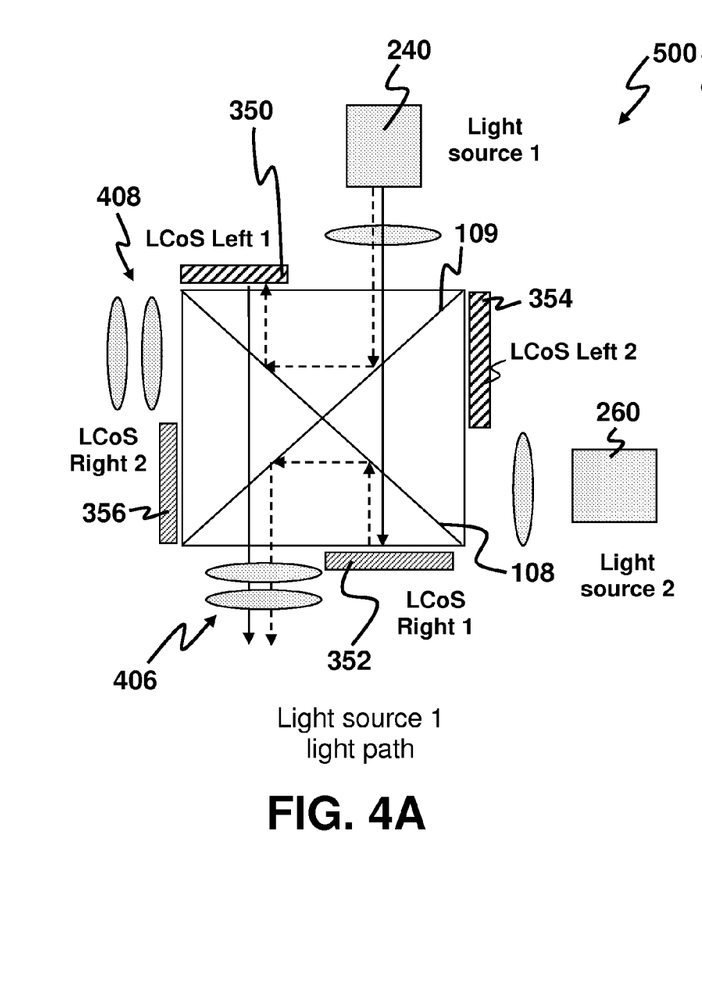
FIGS. 4A-4C depict an image projection apparatus with two light sources, four reflective spatial light modulators, and two projection optics system.

In FIG. 4A, light incident from first light source 240 is incident on polarization beam splitter surface 109. A first reflective spatial light modulator 350 is positioned on the same side of the cube as the first incident light source 240. When the light reaches the PBS surface 109, light of P polarization passes through the cube in a straight line and is incident on second reflective spatial light modulator 352. Light of S polarization is reflected by the polarization beam splitter surface 109 and is again reflected by polarization beam splitter surface 108 into first reflective spatial light modulator 350.

Modulated light of the opposite polarization is reflected by each reflective spatial light modulator 350, 352. Thus, P-polarized light exits reflective spatial light modulator 350 and passes surface through to first set projection optics 406. Similarly, S-polarized light that exits reflective spatial light modulator 352 is also reflected by PBS diagonal 108 and then diagonal 109 towards the first set of projection optics 406.

Figure 4B:
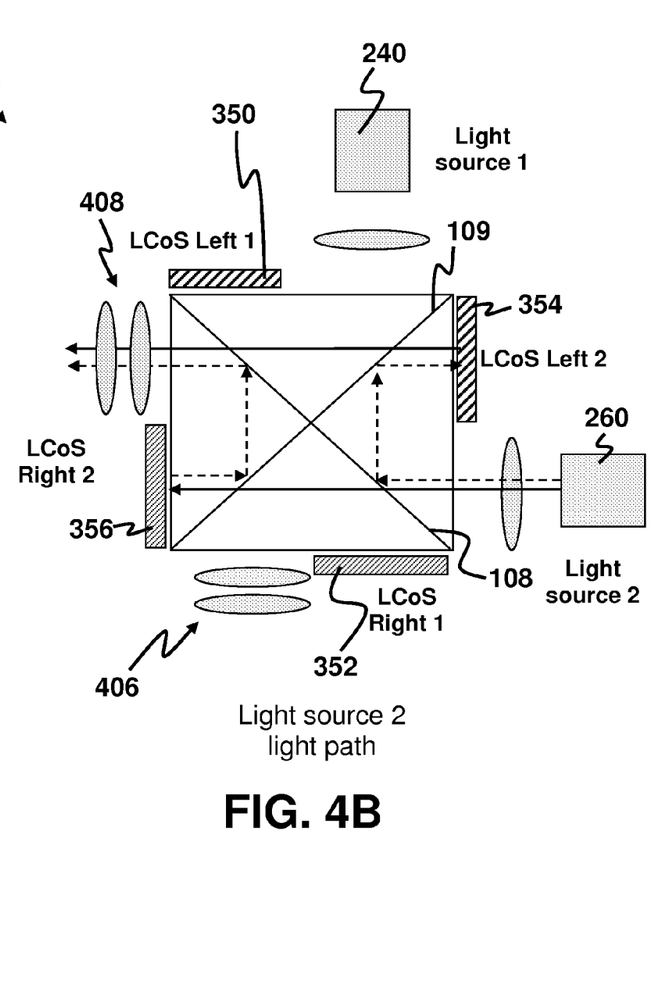

In FIG. 4B, light incident from second light source 260 is incident on polarization beam splitter surface 108. A third reflective spatial light modulator 354 is positioned on the same side of the cube as the second incident light source 260. When the light reaches the PBS surface 108, light of P polarization passes through the cube in a straight line and is incident to fourth reflective spatial light modulator 356. Light of S polarization is reflected by the polarization beam splitter surface 108 and is again reflected by polarization beam splitter surface 109 into third reflective spatial light modulator 354.

Modulated light of the opposite polarization is reflected by each reflective spatial light modulator 354, 356. Thus, P-polarized light exits reflective spatial light modulator 354 and passes surface through to second set projection optics 408. Similarly, S-polarized light that exits reflective spatial light modulator 356 is also reflected by PBS diagonal 109 and then diagonal 108 towards the second set of projection optics 408.

In an exemplary embodiment, the projection apparatus 500 is configured to project a widescreen 3-dimensional image. In general, left and right video contents are decoded by an image processor. Then the left and right images are converted into color grey level images each in a specific polarization direction, such as a left image by a P-beam, and a right image by an S-beam and are used to modulate respective spatial light modulators. A suitable filter such as a pair of passive polarization-glasses blocks the undesired beam respectively for each eye. Hence a stereo image is created inside the human brain when viewing the different view angle images projected on a silver polarization-reserved screen. In such a dual LCoS projection system, the system efficiency can be maximized to 30% and efficiency in 3D mode is nearly 45% compare to the 2D mode brightness—both numbers are the best among existing projection technologies.

Figure 4C:
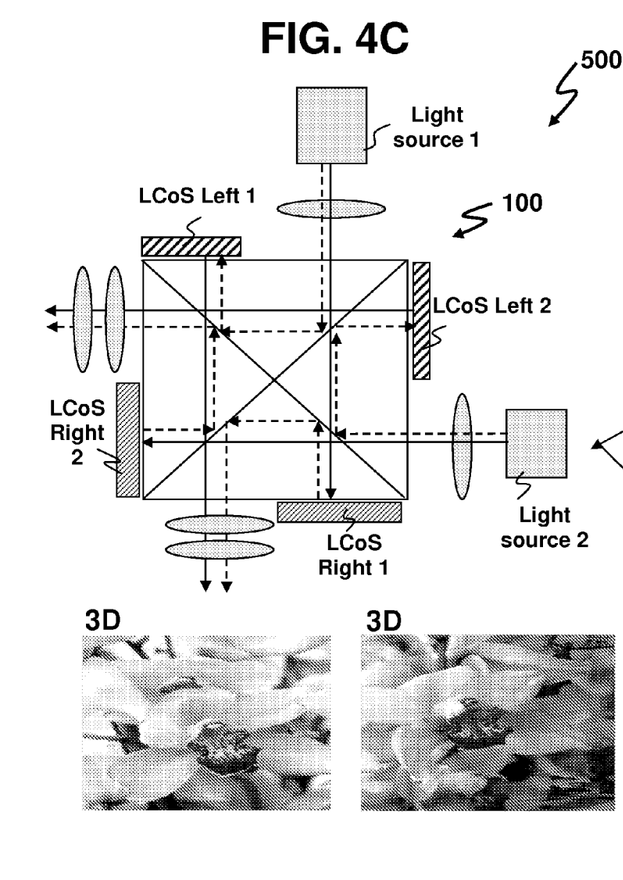
Figure 4D:
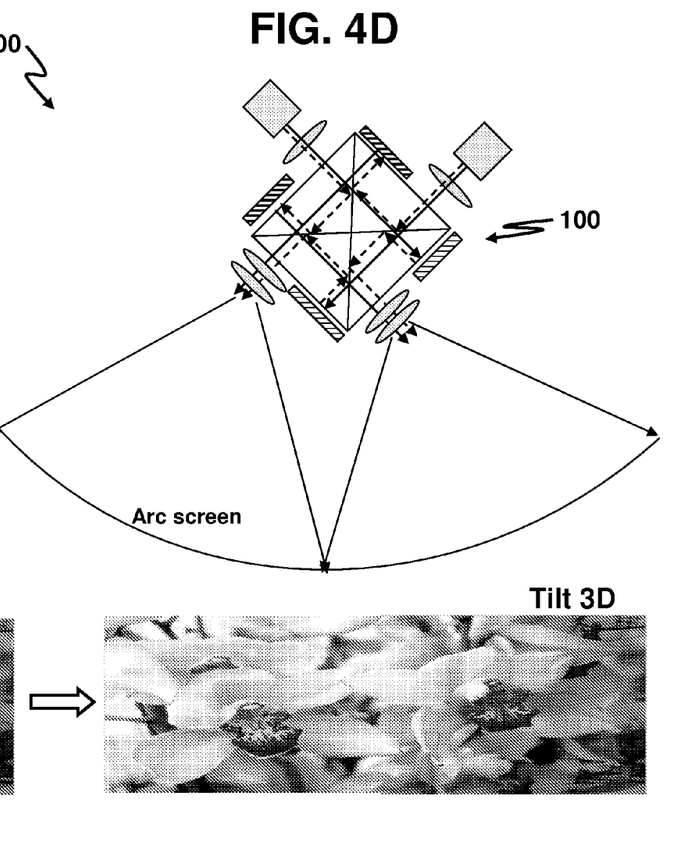

For the embodiment of FIGS. 4A-4C, reflective spatial light modulators 350 and 352 project "left eye" and "right eye" images for a first 3-D image out of projection optics 406 while reflective spatial light modulators 354 and 356 project "left eye" and "right eye" images for a second 3-D image out of projection optics 408. This combined projection is depicted in FIGS. 4C and 4D. As in the embodiment of 2B, two 3-D images can be "stitched together" to form a wide screen 3-D image that can be viewed in 3-D through the use of appropriate polarization filters such as active or passive polarizing eyewear, although other filters can also be used. The system is suitable for virtual reality gaming/movie applications. Besides performing tiled 3D projection, the system can also be used for two double-brightness tiled projection which recycle-uses one "was-to-be-wasted" polarization light by adding the additional pair of LCoS spatial light modulators.

Figure 5:
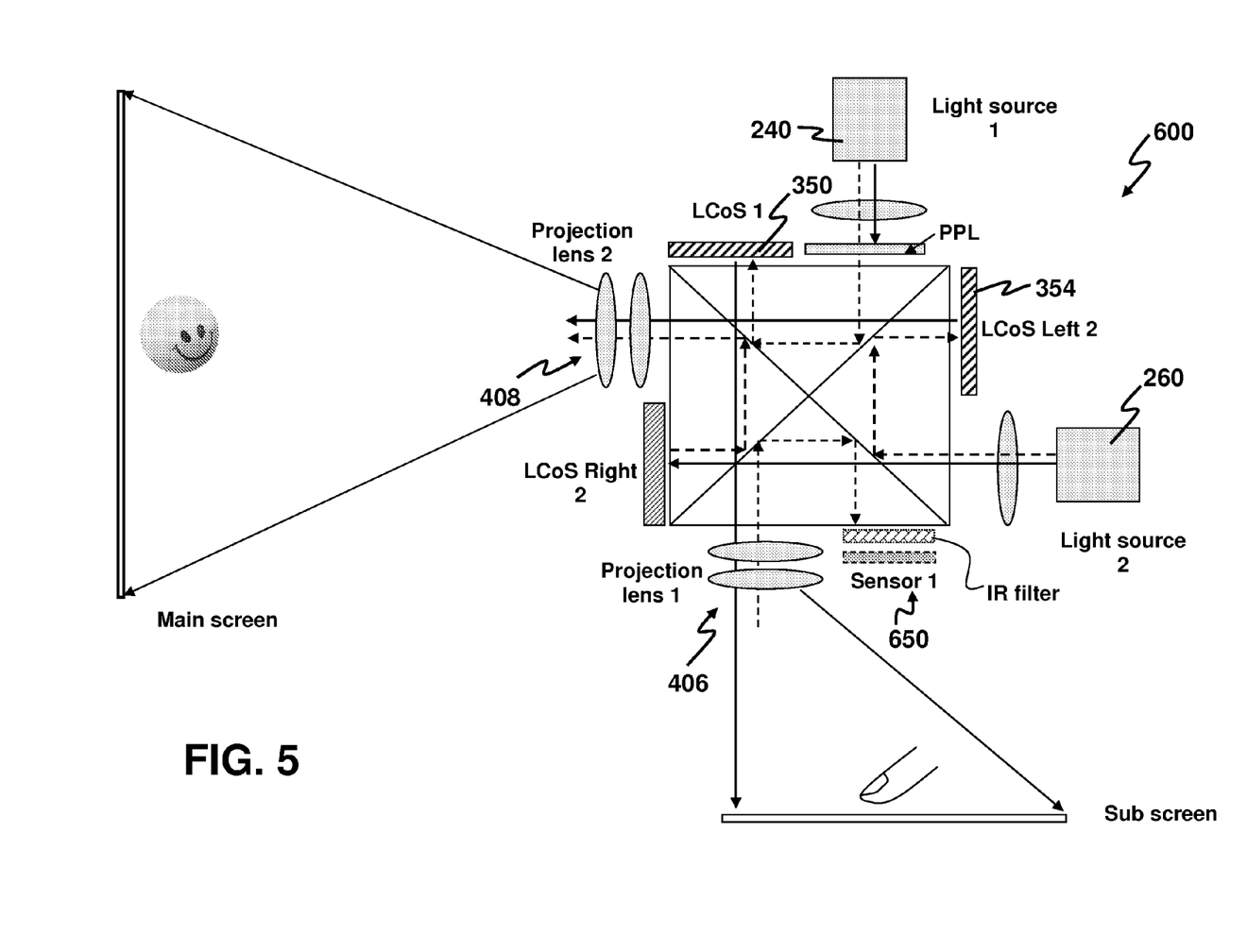
FIG. 5 depicts an image projection apparatus with two light sources, three reflective spatial light modulators, two projection optics systems and an image sensor.

Image projection apparatus 600 of FIG. 5 substitutes an image sensor for one of the reflective spatial light modulators of FIGS. 4A-4D to create an interactive image apparatus in a similar manner to the embodiment of FIG. 3. In this embodiment, two images are displayed as in the embodiments of FIG. 2A and FIG. 3. The image from projection optics 408 will be a 3-D image (when viewed with the appropriate filters such as polarizing eyewear) with reflective spatial light modulators 354 and 356 respectively projecting the "left eye" and "right eye" images. The image from reflective spatial light modulator 350 will be a 2-D imaged projected through optics system 406. As in the embodiment of FIG. 3, user interactive will be reflected back through projection optics 406 and received by image sensor 650 having an optional IR filter. The user input can be used to permit the user to interactively change the 3-D image content or other commands through feedback from the sensor.

Figure 6A:
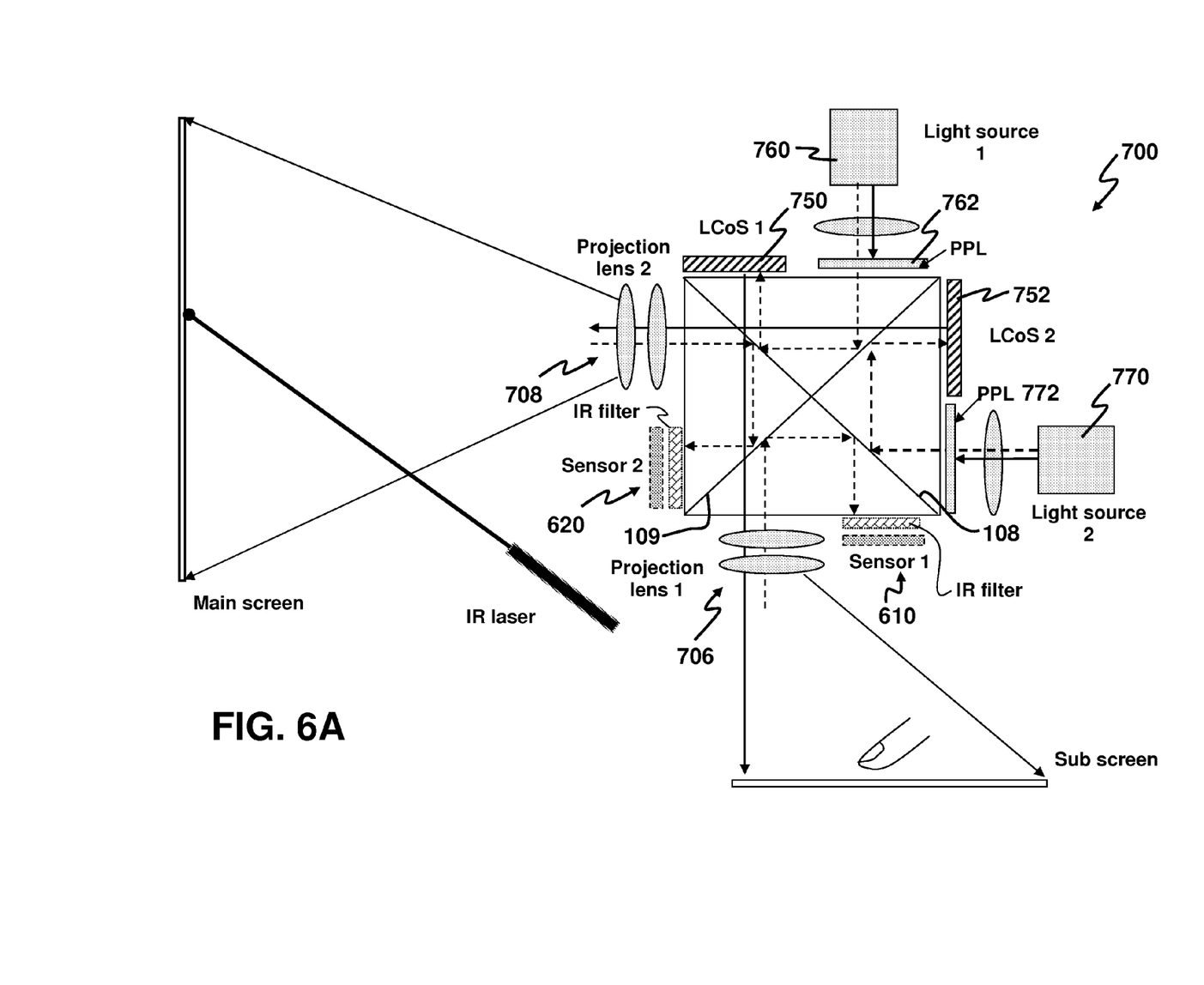
FIGS. 6A-6C depict an image projection apparatus with two polarized light sources, two reflective spatial light modulators, two projection optics systems and two image sensors.
Figure 6B:
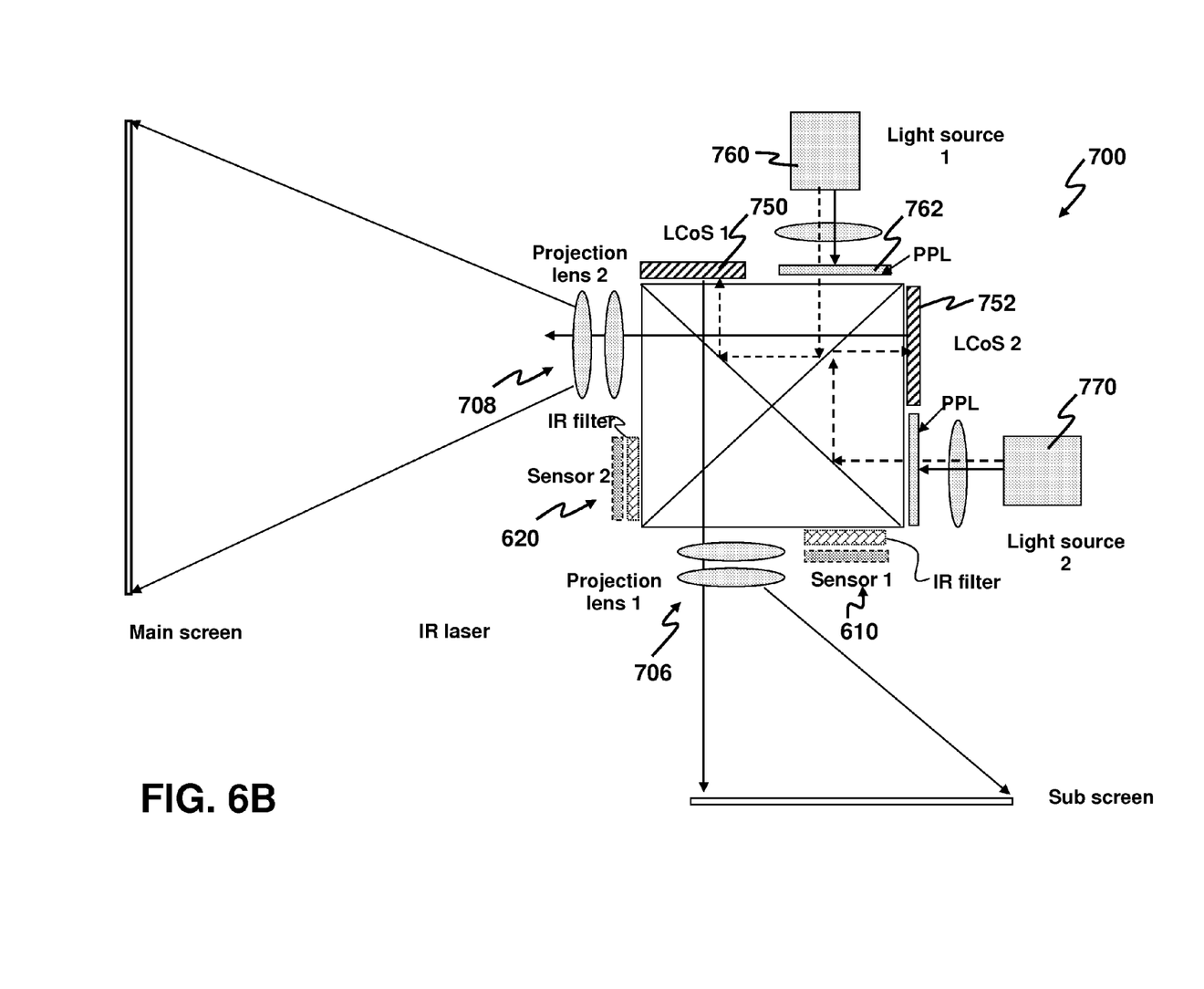
Figure 6C:
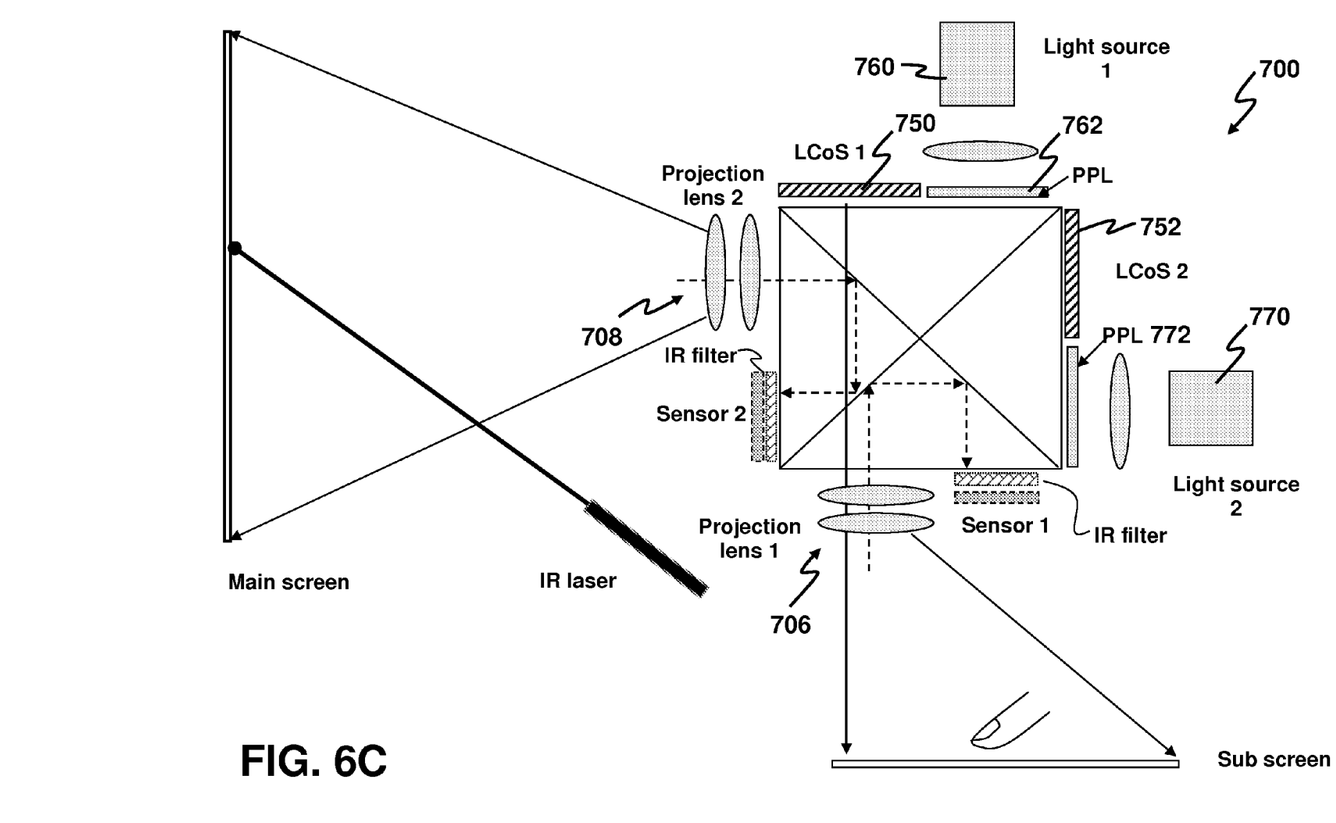

In FIGS. 6A to 6C, an image projector 700 uses two reflective spatial light modulators, two light sources, two projection optics systems, and two image sensors are employed along with PBS cube 100. S-polarized light from light source 760 (having polarizer 762) is incident on diagonal PBS element 109 and is reflected towards second diagonal PBS element 108 towards reflective spatial light modulator 750. P-polarized light reflected from modulator 750 is projected onto a secondary location through projection optics 706. Similarly, S-polarized light from light source 770 (having polarizer 772) is incident on diagonal PBS element 108 and is reflected towards second diagonal PBS element 109 towards second reflective spatial light modulator 752. P-polarized light reflected from modulator 752 is projected through projection optics 708 to a main viewing location. User interaction with the image on either the main viewing location or the secondary viewing location is received by respective image sensors 620 and 610 to allow a user to input information to a system that can be used to change current and future image displays. Each of FIGS. 6A to 6C shows different transmitted and reflected light paths for ease of understanding.

Figure 7A:
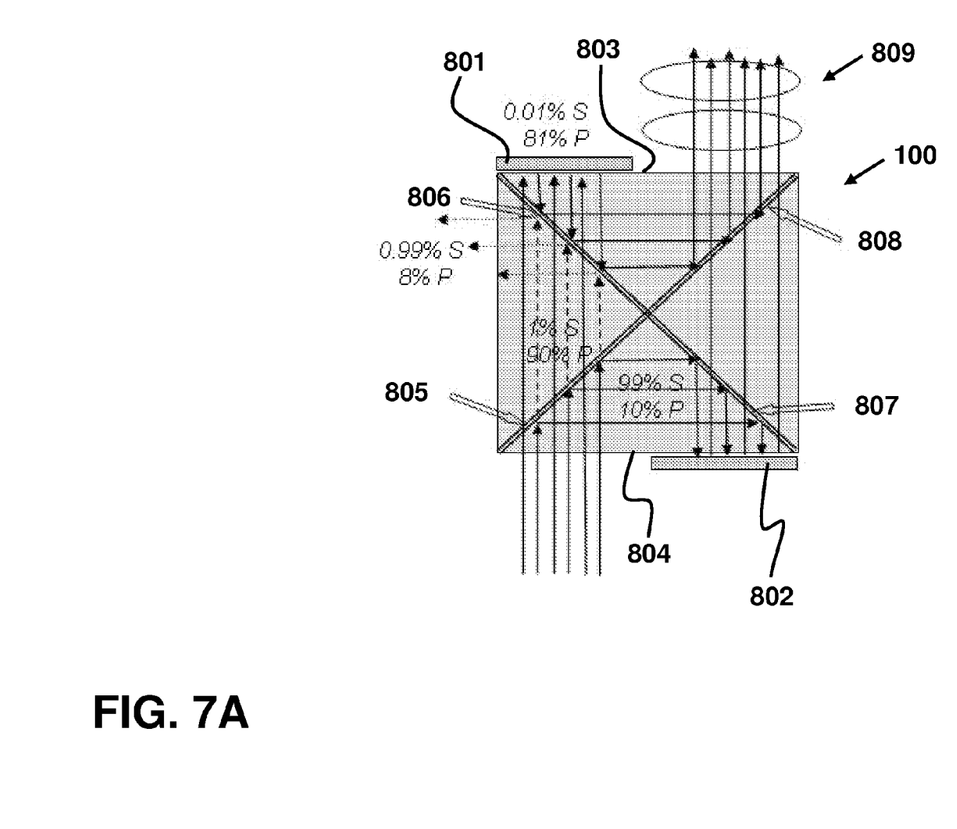
FIGS. 7A-7B depict optional contrast-enhancing features that can be used with the image projection apparatus of the present invention.
Figure 7B:
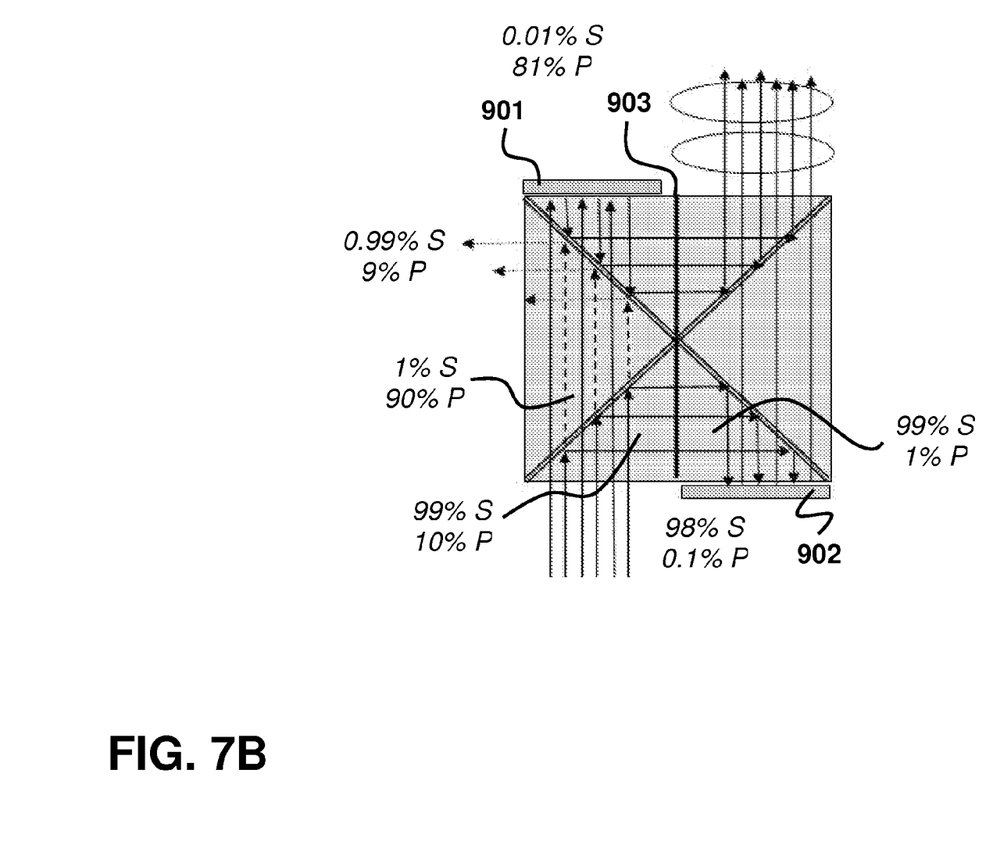

FIGS. 7A and 7B illustrates details of the light paths of the integrated PBS (100) used in various embodiments of the present invention, including optional features to enhance brightness or image contrast. In FIG. 7A two LCoS modulators (801,802) are used, each of which is placed on a half side of an external surface on two opposing sides of the optical cube 100. The light input is divided into P-beam and S-beam by the first polarization beam splitter surface 805; 90% of the P-beam and 1% of the S-beam will pass through the first pre-PBS surface 805; 99% of the S-beam and 10% of the P-beam will be reflected to the first pre-second PBS 806 surface; then 0.01% of the S-beam and 81% of P-beam will pass through the first pre-second PBS surface 806 to illuminate LCoS1 801. And 99% of the S-beam, 10% of the P-beam will be reflected by the second pre-second PBS 807 surface to illuminate the LCoS2 802. With this design, for the LCoS1 801 and LCoS2 802 path, the optical contrast is enhanced from 90:1 to over 1000:1. The analyzer surface 808 is for combining two paths and projecting the image out through projection lens 809.

To further enhance the contrast, a P-polarization 903 analyzer can be added into the prisms as depicted in FIG. 7B and splits the top and bottom two prisms into two parts with a P-clean analyzer coated or attached between the two surfaces of the split parts and then cemented together FIG. 7B the contrast ratio after passing the P-analyzer is at least 100:1. After pre-second PBS, the contrast will be over 1000:1 on LCoS2; so that the P-beam leakage to the S-beam path could be minimized; and the P-beam leakage to S-beam projection system after LCoS1 can also be minimized. As a result, the system contrast can be raised up to 300:1. The contrast ratio also depends on the contrast of the LCoS panels 901, 902 themselves. The P-polarization analyzer 903 can be coated with a polarization beam splitter element, grating micro structure or MOF film, or other materials which can split the light into two orthogonal polarization directions.

While the foregoing invention has been described with respect to various embodiments, such embodiments are not limiting. Numerous variations and modifications would be understood by those of ordinary skill in the art. Such variations and modifications are considered to be included within the scope of the following claims.

The invention claimed is:
1. A multiple image projection apparatus comprising:
at least a first light source for providing light;
an integrated cubic multi-prism beam splitter, having four sides and first and second diagonal interfaces including a beam splitter element positioned on at least a portion of the first diagonal interface;
at least first and second spatial light modulators;
at least first and second projection optics systems;
the first and second spatial light modulators and the first light source being configured such that the first spatial light modulator and the first light source are positioned adjacent one side of the cubic multi-prism beam splitter and the second spatial light modulator and the second projection optics system are positioned adjacent an opposite-facing side of the cubic multi-prism beam splitter such that light from the first light source is divided into first and second polarized beams and directed in different directions by the polarization beam splitter such that the first polarized beam is directed into the first spatial light modulator and the second polarized beam is directed into the second spatial light modulator;
a first image source for modulating the first spatial light modulator;
a second image source, for producing images which may be the same or different from images produced using the first image source, for modulating the second spatial light modulator;

the first and second spatial light modulators and the first and second projection optics systems configured such that a first modulated reflected output image from the first spatial light modulator is output from the first projection optics system and a second modulated reflected output image from the second spatial light modulator is output from the second projection optics system.

2. A multiple image projection apparatus according to claim 1 further comprising a reflective coating formed on at least a portion of the second diagonal interface such that a first modulated reflected output image from the first spatial light modulator is incident on the reflective coating and is reflected out from the first projection optics system and a second modulated reflected output image from the second spatial light modulator is incident on the reflective coating and is reflected out from the second projection optics system.

3. A multiple image projection apparatus according to claim 1 further comprising an image sensor, the image sensor configured to receive user input interaction with one of the first and second output images, the user input interaction having been received through the corresponding first or second projection optics system.

4. A multiple image projection apparatus according to claim 3 further comprising a feedback controller cooperating with the image sensor to receive user input interaction with either the first or second output image.

5. A multiple image projection apparatus according to claim 4 wherein the feedback controller sends out image control signals to one or both of the first and second spatial light modulators in response to the user input interaction.

6. A multiple image projection apparatus according to claim 1 wherein the first and second images are different and the apparatus is positioned such that the first and second images are tiled adjacent to one another on a projection surface to create a wide screen image.

7. A multiple image projection apparatus according to claim 1 wherein the first and second images are the same and the first and second projection optics and first and second spatial light modulators are configured such that the same first and second images of different size and/or different resolution are projected to different locations.

8. A multiple image projection apparatus according to claim 1 wherein the first and second spatial light modulators are selected from one or more of liquid crystal on silicon spatial light modulators, digital micromirror device spatial light modulators, digital light processor spatial light modulators, MEMS spatial light modulators, liquid crystal spatial light modulators, or mirror-based spatial light modulators.

9. A multiple image projection apparatus comprising:
first and second light sources for emitting first and second incident light beams;
an integrated cubic multi-prism beam splitter, having four sides and first and second diagonal interfaces including a beam splitter element positioned on at least a portion of the first diagonal interface and on at least a portion of the second diagonal interface;
first, second, third, and fourth spatial light modulators;
first and second projection optics systems;
the first and second spatial light modulators, the first light source, and the first projection optics system being configured such that the first spatial light modulator and the first light source are positioned adjacent one side of the cubic multi-prism beam splitter and the second spatial light modulator and the first projection optics system are positioned adjacent an opposite-facing side of the cubic multi-prism beam splitter such that light from the first light source forms first and second images from the first and second spatial light modulators that are projected together through the first projection optics system;
the third and fourth spatial light modulators, the second light source, and the second projection optics system being configured such that the third spatial light modulator and the second light source are positioned adjacent one side of the cubic multi-prism beam splitter and the fourth spatial light modulator and the second projection optics system are positioned adjacent an opposite-facing side of the cubic multi-prism beam splitter such that light from the second light source forms third and fourth images from the third and fourth spatial light modulators that are projected together through the second projection optics system.

10. A multiple image projection apparatus according to claim 9 wherein the first and second images form a first composite 3-D image when viewed using a polarizing filter and the third and fourth images form a second composite 3-D image when viewed using a polarizing filter.

11. A multiple image projection apparatus according to claim 9 wherein the polarization beam splitting element is a polarization beam splitter material coating.

12. A multiple image projection apparatus according to claim 9 wherein the first and second images are different and the apparatus is positioned such that the first and second images are tiled adjacent to one another on a projection surface to create a wide screen image.

13. A multiple image projection apparatus according to claim 9 wherein the first second, third, and fourth spatial light modulators are selected from one or more of liquid crystal on silicon spatial light modulators, digital micromirror device spatial light modulators, digital light processor spatial light modulators, MEMS spatial light modulators, liquid crystal spatial light modulators, or mirror-based spatial light modulators.

14. A multiple image projection apparatus comprising:
first and second light sources and first and second polarizers for creating first and second polarized light beams;
an integrated cubic multi-prism beam splitter, having four sides and two diagonal interfaces including beam splitter element positioned on a least a portion of a first diagonal interface and on at least a portion of a second diagonal interface;
first and second spatial light modulators;
first and second projection optics systems;
first and second image sensors;
the first spatial light modulator and the first light source being configured such that the first panel and the first light source are positioned adjacent one side of the cubic multi-prism beam splitter and the second spatial light modulator and the second light source are positioned adjacent another side of the cubic multi-prism beam splitter such that light from the first light source is reflected by the diagonal interfaces of the cubic multi-prism beam splitter into the first spatial light modulator and modulated image light reflected by the first spatial light modulator is projected out through the first projection optics system;
the second spatial light modulator and the second light source being configured such that light from the second light source is reflected by the diagonal interfaces of the cubic multi-prism beam splitter into the second spatial light modulator and modulated image light reflected by the second spatial light modulator is projected out through the second projection optics system;

the first image sensor being positioned such that user interaction with a first projected image is captured by the first image sensor through the first projection optics system;

the second image sensor being positioned such that user interaction with a second projected image is captured by the second image sensor through the second projection optical system.

15. A multiple image projection apparatus according to claim 14 further comprising a feedback controller cooperating with the first and second image sensors to receive user input interaction from the first and second output images.

16. A multiple image projection apparatus according to claim 14 wherein the feedback controller controls input to at least the first or second spatial light modulator in response to the user input interaction.

17. A multiple image projection apparatus according to claim 14 wherein the first and second spatial light modulators are selected from one or more of liquid crystal on silicon spatial light modulators, digital micromirror device spatial light modulators, digital light processor spatial light modulators, MEMS spatial light modulators, liquid crystal spatial light modulators, or mirror-based spatial light modulators.

18. A multiple image projection apparatus comprising:
first and second light sources coupled to polarizing elements for emitting first and second polarized light beams;
an integrated cubic multi-prism beam splitter, having four sides and first and second diagonal interfaces including a beam splitter element positioned on at least a portion of the first diagonal interface and on at least a portion of the second diagonal interface;
first, second, and third spatial light modulators;
first and second projection optics systems;
the first spatial light modulator and the first light source being positioned adjacent one face of the cubic multi-prism beam splitter and the second spatial light modulator and the second light source being positioned adjacent another face of the cubic multi-prism beam splitter such that light from the first light source forms first and second images from the first and second spatial light modulators that are projected together through the first projection optical system;
the second light source and the third spatial light modulator being positioned such that light from the second light source forms a third image from the third spatial light modulator that is reflected by the cubic multi-prism beam splitter out through the second projection optical system;
an image sensor positioned such that user interaction with the third projected image is captured by the image sensor through the second projection optical system.

19. A multiple image projection apparatus according to claim 18 further comprising a feedback controller cooperating with the image sensors to receive the user input interaction.

20. A multiple image projection apparatus according to claim 19 wherein the feedback controller controls input to at least the first or second spatial light modulator in response to the user input interaction.

21. A multiple image projection apparatus according to claim 18 wherein the first second, and third spatial light modulators are selected from one or more of liquid crystal on silicon spatial light modulators, digital micromirror device spatial light modulators, digital light processor spatial light modulators, MEMS spatial light modulators, liquid crystal spatial light modulators, or mirror-based spatial light modulators.

* * * * *